(12) United States Patent
Zhou et al.

(10) Patent No.: US 10,880,779 B2
(45) Date of Patent: Dec. 29, 2020

(54) USER PLANE RESOURCE MANAGEMENT METHOD, USER PLANE NETWORK ELEMENT, AND CONTROL PLANE NETWORK ELEMENT

(71) Applicant: Huawei Technologies Co., Ltd., Guangdong (CN)

(72) Inventors: Runze Zhou, Shanghai (CN); Yanping Zhang, Shanghai (CN); Zhongping Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/193,856

(22) Filed: Nov. 16, 2018

(65) Prior Publication Data

US 2019/0090159 A1  Mar. 21, 2019

Related U.S. Application Data

(63) Continuation of application No. PCT/CN2016/082418, filed on May 17, 2016.

(51) Int. Cl.
*H04W 4/00*  (2018.01)
*H04W 28/16*  (2009.01)
(Continued)

(52) U.S. Cl.
CPC .......... *H04W 28/16* (2013.01); *H04W 28/08* (2013.01); *H04W 76/11* (2018.02)

(58) Field of Classification Search
CPC ...... H04W 28/16; H04W 76/11; H04W 28/08
See application file for complete search history.

(56) References Cited

U.S. PATENT DOCUMENTS

2004/0002332 A1  1/2004 Noma
2006/0194599 A1*  8/2006 Villwock ............. H04W 24/00
455/509
(Continued)

FOREIGN PATENT DOCUMENTS

CN  1477803 A  2/2004
CN  101001252 A  7/2007
(Continued)

OTHER PUBLICATIONS

Nokia, "Path Switching on S1," R3-061522, 3GPP TSG-RAN WG3 Meeting #53bis, Seoul, Republic of Korea, Oct. 10-13, 2006, 3 pages.
(Continued)

*Primary Examiner* — Abdelnabi O Musa
(74) *Attorney, Agent, or Firm* — Womble Bond Dickinson (US) LLP

(57) ABSTRACT

The embodiment of the present application relates a user plane resource management method, a user plane network element, and a control plane network. The method carried out by a user plane network element includes: receiving a data transmission channel establishment request message sent by a control plane network element, where the data transmission channel establishment request message is used to instruct the user plane network element to establish a data transmission channel; establishing the data transmission channel based on current user plane resource status information, and assigning a channel identifier marking the data transmission channel; and sending, the channel identifier to the control plane network element.

9 Claims, 6 Drawing Sheets

(51) Int. Cl.
*H04W 76/11* (2018.01)
*H04W 28/08* (2009.01)

(56) References Cited

U.S. PATENT DOCUMENTS

| | | | | |
|---|---|---|---|---|
| 2013/0265917 | A1* | 10/2013 | Lv | H04W 24/02 370/310 |
| 2015/0333893 | A1* | 11/2015 | Lee | H04L 1/0026 370/252 |
| 2015/0359019 | A1* | 12/2015 | Chen | H04W 76/12 370/329 |
| 2017/0135068 | A1* | 5/2017 | Kodaypak | H04L 65/103 |

FOREIGN PATENT DOCUMENTS

| | | |
|---|---|---|
| CN | 101072092 A | 11/2007 |
| CN | 101094096 A | 12/2007 |
| CN | 103945559 A | 7/2014 |
| EP | 1377089 A1 | 1/2004 |
| EP | 2955954 A1 | 12/2015 |

OTHER PUBLICATIONS

SA WG2 Temporary Document, "Cover Sheet for TR 23.714 to TSG SA for Approval," TD SP-160330, 3GPP TSG SA Meeting #72, Busan, South Korea, Jun. 15-17, 2016, 1 page.

3GPP TR 23.714 V1.0.0 (Jun. 2016), Technical Report, 3rd Generation Partnership Project; Technical Specification Group Services and System Aspects; Study on control and user plane separation of EPC nodes (Release 14), 87 pages.

CISCO: "Solution to key issue#2: Selection mechanism for user plane functional entities", 3GPP Draft; S2-154421, vol. SA WG2, na. Anaheim, USA; Nov. 2015. XP051035904.

Huawei, HiSilicon, "Parameters for Sx Reference Points," S2-161963 (revision of S2-161781), SA WG2 Temporary Document, SA WG2 Meeting #114, Sophia Antipolis, France, Apr. 11-15, 2016, 8 pages, XP051092030.

* cited by examiner

USER PLANE RESOURCE MANAGEMENT METHOD, USER PLANE NETWORK ELEMENT, AND CONTROL PLANE NETWORK ELEMENT

CROSS-REFERENCE TO RELATED APPLICATIONS

This application is a continuation of International Application No. PCT/CN2016/082418 filed on May 17, 2016. The disclosure of the aforementioned application is hereby incorporated by reference in the entity.

TECHNICAL FIELD

The present application relates to the field of communications technologies, and in particular, to a user plane resource management method, a user plane network element, and a control plane network element.

BACKGROUND

An evolved packet system (EPS) is a concept appearing in the 4th generation mobile communication. As shown in FIG. 1, the EPS includes a wireless network and a core network. The wireless network is an evolved universal terrestrial radio access network (E-UTRAN). The E-UTRAN includes an evolved NodeB (eNB). User equipment (UE) access a Long Term Evolution (LTE) network. The core network is an evolved packet core (EPC). The EPC includes a mobility management entity (MME), a serving gateway (S-GW), and a packet data network gateway (P-GW). The EPS may further include a home subscriber server (HSS). The HSS is configured to store subscriber subscription information.

The S-GW and the P-GW each have a control plane function and a user plane function. The control plane function mainly includes a signaling connection to another network element, processing of a mobility management and session management request of a user, user context management, and establishment of a data transmission channel. The user plane function mainly includes data packet forwarding. A network element having a control plane function is referred to as a control plane network element, and a network element having a user plane function is referred to as a user plane network element. When a data transmission channel needs to be established for a new service, the control plane network element always is the first to sense the need, and then the control plane network element instructs the user plane network element to assign a bandwidth resource based on a service requirement. For example, when a bandwidth needs to be assigned to a new service, the control plane network element assigns a channel identifier, and notifies the user plane network element of the channel identifier. The user plane network element establishes a data transmission channel. When the user plane network element establishes the data transmission channel, even if the user plane network element includes a plurality of physical resources (for example, physical boards) or a plurality of virtual resources (for example, virtual machines), the user plane network element establishes the data transmission channel in a sequence of using a resource only after a previous resource is used up. As a result, user plane resources of the user plane network element are not effectively managed.

SUMMARY

Embodiments of the present disclosure provide a user plane resource management method, a user plane network element, and a control plane network element. The user plane network element and the control plane network element can separately assign, based on user plane resource status information, a channel identifier marking a data transmission channel, and the user plane network element can establish the data transmission channel based on the user plane resource status information, to effectively manage user plane resources.

According to a first aspect, an embodiment of the present disclosure provides a user plane resource management method, including: receiving, by a user plane network element, a data transmission channel establishment request message sent by a control plane network element, where the data transmission channel establishment request message is used to instruct the user plane network element to establish a data transmission channel; and establishing, by the user plane network element, the data transmission channel based on current user plane resource status information, and assigning a channel identifier marking the data transmission channel; and sending, by the user plane network element, the channel identifier to the control plane network element.

With reference to the first aspect, in a first possible implementation of the first aspect, before the receiving, by a user plane network element, a data transmission channel establishment request message sent by a control plane network element, the method further includes:

sending, by the user plane network element, a capability indication to the control plane network element, where the capability indication is used to indicate that the user plane network element supports a channel management capability.

With reference to the first possible implementation of the first aspect, in a second possible implementation of the first aspect, the channel management capability includes at least one of or a combination of a plurality of the following: a channel identifier assignment capability, channel detection, and channel status reporting.

With reference to the first aspect, the first possible implementation of the first aspect, or the second possible implementation of the first aspect, in a third possible implementation of the first aspect, the user plane resource status information includes resource status information of at least one internal resource block of the user plane network element, and the internal resource block is represented by using an internal resource block identifier.

With reference to the third implementation of the first aspect, in a fourth possible implementation of the first aspect, the internal resource block is a hardware resource block and/or a virtual resource block.

With reference to the third possible implementation of the first aspect or the fourth possible implementation of the first aspect, in a fifth possible implementation of the first aspect, the user plane resource status information further includes at least one assignable channel identifier that is used to mark a data transmission channel and that corresponds to the internal resource block.

With reference to the third possible implementation of the first aspect or the fourth possible implementation of the first aspect, in a sixth possible implementation of the first aspect, the user plane resource status information further includes at least one assignable channel identifier that is used to mark a data transmission channel and that is of the user plane network element.

According to a second aspect, an embodiment of the present disclosure provides a user plane resource management method, including: receiving, by a control plane network element, a capability indication of a user plane network element, where the capability indication is used to indicate that the user plane network element supports a channel management capability; sending, by the control plane network element, a data transmission channel establishment request message to the user plane network element, where the data transmission channel establishment request message does not include a channel identifier, and the data transmission channel establishment request message is used to instruct the user plane network element to establish a data transmission channel; and receiving, by the control plane network element, a channel identifier sent by the user plane network element.

With reference to the second aspect, in a first possible implementation of the second aspect, the channel management capability includes at least one of or a combination of a plurality of the following: a channel identifier assignment capability, channel detection, and channel status reporting.

According to a third aspect, an embodiment of the present disclosure provides a user plane resource management method, including: receiving, by a control plane network element, a capability indication of a user plane network element, where the capability indication is used to indicate that the user plane network element does not support a channel management capability; sending, by the control plane network element, a data transmission channel establishment request message, where the data transmission channel establishment request message includes a channel identifier, the data transmission channel establishment request message is used to instruct the user plane network element to establish a data transmission channel, and the channel identifier is used to mark the to-be-established data transmission channel.

With reference to the third aspect, in a first possible implementation of the third aspect, the channel management capability includes at least one of or a combination of a plurality of the following: a channel identifier assignment capability, channel detection, and channel status reporting.

With reference to the third aspect or the first possible implementation of the third aspect, in a second possible implementation of the third aspect, the channel identifier is assigned by the control plane network element based on user plane resource status information of the user plane network element.

With reference to the second possible implementation of the third aspect, in a third possible implementation of the third aspect, the user plane resource status information includes resource status information of at least one internal resource block of the user plane network element, and the internal resource block is represented by using an internal resource block identifier.

With reference to the third possible implementation of the third aspect, in a fourth possible implementation of the third aspect, the internal resource block is a hardware resource block and/or a virtual resource block.

With reference to the third possible implementation of the third aspect or the fourth possible implementation of the third aspect, in a fifth possible implementation of the third aspect, the user plane resource status information further includes at least one assignable channel identifier that is used to mark a data transmission channel and that corresponds to the internal resource block.

With reference to the third possible implementation of the third aspect or the fourth possible implementation of the third aspect, in a sixth possible implementation of the third aspect, the user plane resource status information further includes at least one assignable channel identifier that is used to mark a data transmission channel and that is of the user plane network element.

With reference to the sixth possible implementation of the third aspect, in a seventh possible implementation of the third aspect, the method further includes: receiving, by the control plane network element, a target resource block identifier that corresponds to a target resource block used to establish the data transmission channel and that is sent by the user plane network element.

With reference to the fifth possible implementation of the third aspect or the seventh possible implementation of the third aspect, in an eighth possible implementation of the third aspect, the method further includes: receiving, by the control plane network element, the user plane resource status information sent by the user plane network element.

With reference to the eighth possible implementation of the third aspect, in a ninth possible implementation of the third aspect, the method further includes: sending, by the control plane network element, a data transmission channel suspension request message to the user plane network element, where the data transmission channel suspension request message carries the channel identifier marking the data transmission channel or the target resource block identifier of the target resource block used to establish the data transmission channel.

With reference to the eighth possible implementation of the third aspect, in a tenth possible implementation of the third aspect, the method further includes: sending, by the control plane network element, a data transmission channel close request message to the user plane network element, where the data transmission channel close request message carries the channel identifier marking the data transmission channel or the target resource block identifier of the target resource block used to establish the data transmission channel.

According to a fourth aspect, an embodiment of the present disclosure provides a user plane resource management method, including: receiving, by a user plane network element, a data transmission channel establishment request message sent by a control plane network element, where the establishment request message includes a channel identifier, the data transmission channel establishment request message is used to instruct the user plane network element to establish a data transmission channel, and the channel identifier is used to mark the to-be-established data transmission channel; and establishing, by the user plane network element, the data transmission channel based on the channel identifier and current user plane resource status information, and marking the data transmission channel by using the channel identifier.

With reference to the fourth aspect, in a first possible implementation of the fourth aspect, the method further includes: sending, by the user plane network element, a capability indication to the control plane network element, where the capability indication is used to indicate that the user plane network element does not support a channel management capability.

With reference to the first possible implementation of the fourth aspect, in a second possible implementation of the fourth aspect, the channel management capability includes at least one of or a combination of a plurality of the following: a channel identifier assignment capability, channel detection, and channel status reporting.

With reference to the fourth aspect, the first possible implementation of the fourth aspect, or the second possible implementation of the fourth aspect, in a third possible implementation of the fourth aspect, the user plane resource status information includes resource status information of at least one internal resource block of the user plane network element, and the internal resource block is represented by using an internal resource block identifier.

With reference to the third possible implementation of the fourth aspect, in a fourth possible implementation of the fourth aspect, the internal resource block is a hardware resource block and/or a virtual resource block.

With reference to the third possible implementation of the fourth aspect or the fourth possible implementation of the fourth aspect, in a fifth possible implementation of the fourth aspect, the user plane resource status information further includes at least one assignable channel identifier that is used to mark a data transmission channel and that corresponds to the internal resource block.

With reference to the third possible implementation of the fourth aspect or the fourth possible implementation of the fourth aspect, in a sixth possible implementation of the fourth aspect, the user plane resource status information further includes at least one assignable channel identifier that is used to mark a data transmission channel and that is of the user plane network element.

With reference to the sixth possible implementation of the fourth aspect, in a seventh possible implementation of the fourth aspect, the method further includes: sending, by the user plane network element to the control plane network element, a target resource block identifier that corresponds to a target resource block used to establish the data transmission channel.

With reference to the fifth possible implementation of the fourth aspect or the seventh possible implementation of the fourth aspect, in an eighth possible implementation of the fourth aspect, the method further includes: sending, by the user plane network element, the user plane resource status information to the control plane network element.

With reference to the eighth possible implementation of the fourth aspect, in a ninth possible implementation of the fourth aspect, the method further includes: receiving, by the user plane network element, a data transmission channel suspension request message sent by the control plane network element, where the data transmission channel suspension request message carries the channel identifier marking the data transmission channel or the target resource block identifier of the target resource block used to establish the data transmission channel; and suspending, by the user plane network element, the data transmission channel based on the channel identifier, or suspending, based on the target resource block identifier, all data transmission channels included in the target resource block.

With reference to the eighth possible implementation of the fourth aspect, in a tenth possible implementation of the fourth aspect, the method further includes: receiving, by the user plane network element, a data transmission channel close request message sent by the control plane network element, where the data transmission channel close request message carries the channel identifier marking the data transmission channel or the target resource block identifier of the target resource block used to establish the data transmission channel; and closing, by the user plane network element, the data transmission channel based on the channel identifier and releasing a user plane resource of the data transmission channel, or closing, based on the target resource block identifier, all data transmission channels included in the target resource block and releasing a user plane resource of all the data transmission channels.

According to a fifth aspect, an embodiment of the present disclosure provides a user plane network element, including: a receiving unit, configured to receive a data transmission channel establishment request message sent by a control plane network element, where the data transmission channel establishment request message is used to instruct the user plane network element to establish a data transmission channel; an establishment unit, configured to: establish the data transmission channel based on current user plane resource status information, and assign a channel identifier marking the data transmission channel; and a sending unit, configured to send the channel identifier to the control plane network element. In a feasible solution, the user plane network element further has a function of implementing any possible implementation of the first aspect that is described in the first aspect, and details are not described herein again. The function may be implemented by hardware, or by hardware executing corresponding software. The hardware or software includes one or more modules corresponding to the function.

In a possible design, a structure of the user plane network element includes a processor and a memory. The memory is configured to store application program code supporting a monitoring device in performing the foregoing method, and the processor is configured to execute an application program stored in the memory. The user plane network element may further include a transceiver. The transceiver is configured to support the user plane network element in communicating with a control plane network element, another device, or a communications network.

According to a sixth aspect, an embodiment of the present disclosure provides a computer storage medium, configured to store a computer software instruction used by the user plane network element in the fifth aspect. The computer software instruction includes a program designed for the user plane network element to perform the foregoing aspect.

According to a seventh aspect, an embodiment of the present disclosure provides a control plane network element, including: a receiving unit, configured to receive a capability indication of a user plane network element, where the capability indication is used to indicate that the user plane network element supports a channel management capability; and a sending unit, configured to send a data transmission channel establishment request message to the user plane network element, where the data transmission channel establishment request message does not include a channel identifier, and the data transmission channel establishment request message is used to instruct the user plane network element to establish a data transmission channel, where the receiving unit is further configured to receive a channel identifier sent by the user plane network element.

In a feasible solution, the control plane network element further has a function of implementing any possible implementation of the second aspect that is described in the second aspect, and details are not described herein again. The function may be implemented by hardware, or by hardware executing corresponding software. The hardware or software includes one or more modules corresponding to the function.

In a possible design, a structure of the control plane network element includes a processor and a memory. The memory is configured to store application program code supporting a monitoring device in performing the foregoing method, and the processor is configured to execute an application program stored in the memory. The control plane network element may further include a transceiver. The transceiver is configured to support the control plane network element in communicating with a control plane network element, another device, or a communications network.

According to an eighth aspect, an embodiment of the present disclosure provides a computer storage medium, configured to store a computer software instruction used by the control plane network element in the seventh aspect, where the computer software instruction includes a program designed for the control plane network element to perform the foregoing aspect.

According to a ninth aspect, an embodiment of the present disclosure provides a control plane network element, including: a receiving unit, configured to receive a capability indication of a user plane network element, where the capability indication is used to indicate that the user plane network element does not support a channel management capability; and a sending unit, configured to send a data transmission channel establishment request message, where the data transmission channel establishment request message includes a channel identifier, the data transmission channel establishment request message is used to instruct the user plane network element to establish a data transmission channel, and the channel identifier is used to mark the to-be-established data transmission channel. In a feasible solution, the control plane network element further has a function of implementing any possible implementation of the third aspect described in the third aspect, and details are not described herein again. The function may be implemented by hardware, or by hardware executing corresponding software. The hardware or software includes one or more modules corresponding to the function.

In a possible design, a structure of the control plane network element includes a processor and a memory. The memory is configured to store application program code supporting a monitoring device in performing the foregoing method, and the processor is configured to execute an application program stored in the memory. The control plane network element may further include a transceiver. The transceiver is configured to support the control plane network element in communicating with a control plane network element, another device, or a communications network.

According to a tenth aspect, an embodiment of the present disclosure provides a computer storage medium, configured to store a computer software instruction used by the control plane network element in the fifth aspect, where the computer software instruction includes a program designed for the control plane network element to perform the foregoing aspect.

According to an eleventh aspect, an embodiment of the present disclosure provides a user plane network element, including: a receiving unit, configured to receive a data transmission channel establishment request message sent by a control plane network element, where the establishment request message includes a channel identifier, the data transmission channel establishment request message is used to instruct the user plane network element to establish a data transmission channel, and the channel identifier is used to mark the to-be-established data transmission channel; and an establishment unit, configured to: establish the data transmission channel based on the channel identifier and current user plane resource status information, and mark the data transmission channel by using the channel identifier. In a feasible solution, the user plane network element further has a function of implementing any possible implementation of the fourth aspect described in the fourth aspect, and details are not described herein again. The function may be implemented by hardware, or by hardware executing corresponding software. The hardware or software includes one or more modules corresponding to the function.

In a possible design, a structure of the user plane network element includes a processor and a memory. The memory is configured to store application program code supporting a monitoring device in performing the foregoing method, and the processor is configured to execute an application program stored in the memory. The user plane network element may further include a transceiver. The transceiver is configured to support the user plane network element in communicating with a control plane network element, another device, or a communications network.

According to a twelfth aspect, an embodiment of the present disclosure provides a computer storage medium, configured to store a computer software instruction used by the user plane network element in the fifth aspect, where the computer software instruction includes a program designed for the user plane network element to perform the foregoing aspect.

In the present disclosure, names of the control plane network element and the user plane network element do not constitute a limitation on the devices. In an actual implementation, the devices may have other names. The devices belong to the scope of the claims of the present disclosure and equivalent technologies thereof provided that functions of the devices are similar to those in the present disclosure.

In comparison with the prior art, in the solutions provided in the present disclosure, the user plane network element and the control plane network element each can assign, based on the user plane resource status information, the channel identifier marking the data transmission channel, and the user plane network element can establish the data transmission channel based on the user plane resource status information, to effectively manage user plane resources.

These aspects or other aspects of the present disclosure are more concise and understandable in descriptions of the following embodiments.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Network architectures and service scenarios described in the embodiments of the present disclosure are intended to more clearly describe the technical solutions in the embodiments of the present disclosure, but are not intended to limit the technical solutions provided in the embodiments of the present disclosure. A person of ordinary skill in the art may know that as the network architectures evolve and a new service scenario emerges, the technical solutions provided in the embodiments of the present disclosure are further applicable to a similar technical problem. It should be noted that, the terms used in the embodiments of the present disclosure are merely for the purpose of illustrating specific embodiments, and are not intended to limit the present disclosure. The terms "a", "the", and "this" of singular forms used in the embodiments and the appended claims of the present disclosure are also intended to include plural forms, unless otherwise specified in the context clearly. It should also be understood that, the term "and/or" used in this specification indicates and includes any or all possible combinations of one or more associated listed items. In addition, in this specification, claims, and accompanying drawings of the present disclosure, the terms "first", "second", "third", "fourth", and so on are intended to distinguish between different objects but do not indicate a particular order. Moreover, the terms "including", "having", and any other variant thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Network architectures and service scenarios described in the embodiments of the present disclosure are intended to more clearly describe the technical solutions in the embodiments of the present disclosure, but are not intended to limit the technical solutions provided in the embodiments of the present disclosure. A person of ordinary skill in the art may know that as the network architectures evolve and a new service scenario emerges, the technical solutions provided in the embodiments of the present disclosure are further applicable to a similar technical problem. In addition to an EPS system, the embodiments of the present disclosure may be further applied to other related systems supporting user plane resource management. The various communications systems are, for example, a Global System for Mobile communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, and an LTE time division duplex (TDD) system.

Figure 1:
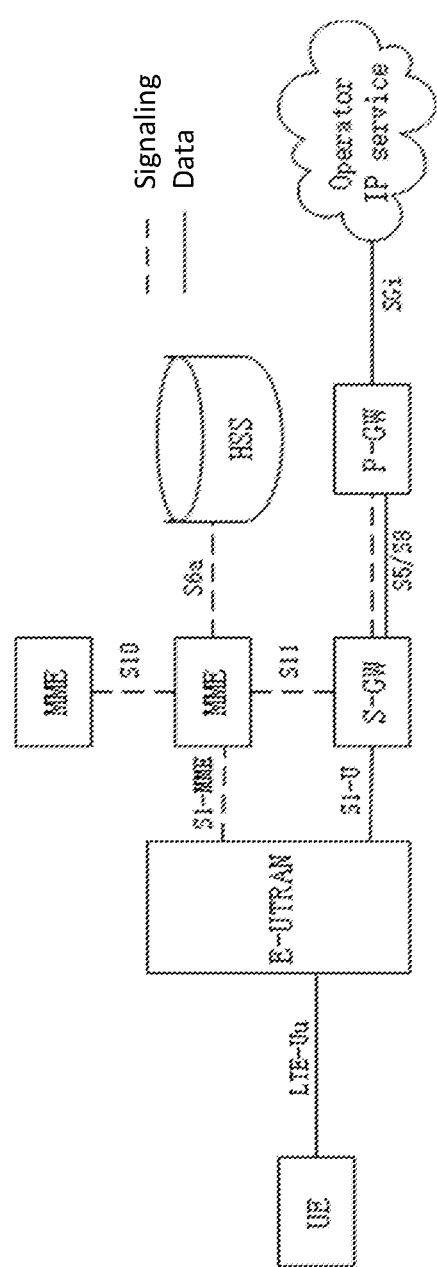
FIG. 1 is an architectural diagram of a possible EPS system.
Figure 2:
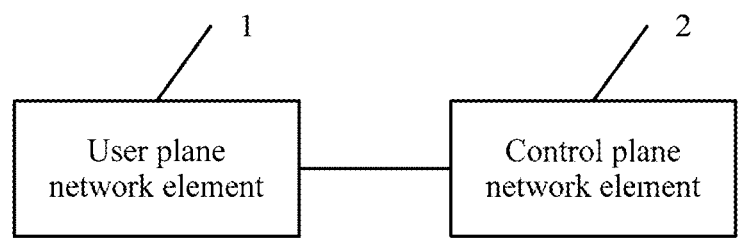
FIG. 2 is a schematic structural diagram of a user plane resource management system according to an embodiment of the present disclosure.

FIG. 2 shows a user plane resource management system according to the present disclosure. As shown in FIG. 2, the user plane resource management system shown in an embodiment of the present disclosure includes a user plane network element 1 and a control plane network element 2. The user plane network element 1 has a data packet forwarding function, and the control plane network element 2 may have functions such as a signaling connection to another network element, processing a mobility management and session management request of a user, managing user context, and establishing a data transmission channel. This embodiment of the present disclosure does not limit other functions of the user plane network element 1 and the control plane network element 2 other than the functions described in the embodiments of the present disclosure. Actually, the user plane network element 1 may have a user plane function of an S-GW and/or a user plane function of a P-GW in FIG. 1, and the control plane network element 2 may have a control plane function of the S-GW and/or a control plane function of the P-GW in FIG. 1. In addition, the "user plane network element" and the "control plane network element" herein are merely names, and the names do not constitute any limitation on the devices.

Figure 3:
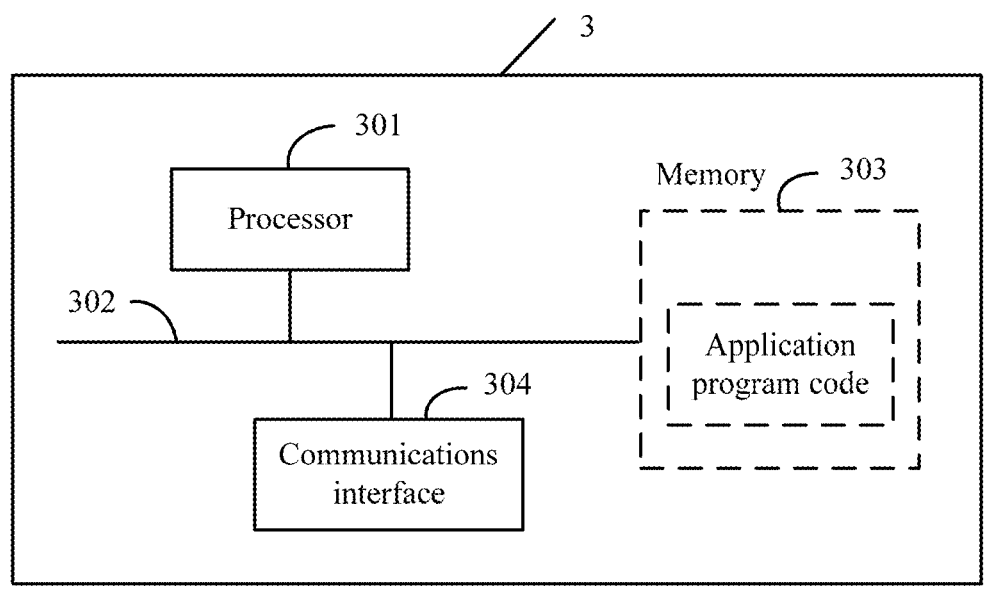
FIG. 3 is a schematic structural diagram of a computer device according to an embodiment of the present disclosure.

The user plane network element and the control plane network element in FIG. 2 may be implemented in a manner of a computer device in FIG. 3.

FIG. 3 is a schematic structural diagram of a computer device according to an embodiment of the present disclosure. As shown in FIG. 3, the computer device 3 includes at least one processor 301, a bus 302, a memory 303, and a communications interface 304.

The processor 301 may be a general central processing unit (CPU), a micro-processor, an application-specific integrated circuit (ASIC), or one or more integrated circuits configured to control execution of a program of the solutions of the present disclosure.

The bus 302 may include a channel for transmitting information between the components. The bus 302 may be a Peripheral Component Interconnect (PCI) bus or an extended industry standard architecture (EISA) bus, or the like. The bus 302 may be categorized as an address bus, a data bus, a control bus, or the like. For ease of indication, the bus is indicated by using only one bold line in FIG. 3. However, it does not indicate that there is only one bus or only one type of bus.

The memory 303 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM), or other compact disc storage or optical disc storage (including a compressed optical disc, a laser disc, an optical disc, a digital universal optical disc, a Blu-ray optical disc, and the like), a magnetic disk storage medium or another magnetic storage device, or any other medium that can carry or store expected program code in a form of instructions or data structures and that can be accessed by a computer, but is not limited thereto. The memory 303 may exist independently, or may be connected to the processor 301 by using the bus 302. The memory 303 may be integrated with the processor 301.

Optionally, the memory 303 is configured to store application program code of performing the solutions of the present disclosure, and the processor 301 controls execution. The processor 301 is configured to execute the application program code stored in the memory 303.

In an embodiment, the processor 301 may include one or more CPUs.

In an embodiment, the computer device 3 may include a plurality of processors. Each of the processors may be a single-core processor, or may be a multi-core processor. The processors may be one or more devices, circuits, and/or processing cores configured to process data (for example, a computer program instruction).

The computer device 3 may be a general computer device or a dedicated computer device. In a specific implementation, the computer device 3 may be a desktop computer, a portable computer, a network server, a palmtop computer (PDA), a mobile phone, a tablet computer, a wireless terminal device, a communications device, an embedded device, or a device having a similar structure of FIG. 3. This embodiment of the present disclosure does not limit a type of the computer device 3.

In one aspect, the user plane network element 1 in FIG. 2 may be the computer device 3 shown in FIG. 3. The processor 301 may perform a user plane resource management method provided in the present disclosure. For example, the user plane network element receives a data transmission channel establishment request message sent by a control plane network element, where the data transmission channel establishment request message is used to instruct the user plane network element to establish a data transmission channel; the user plane network element establishes the data transmission channel based on current user plane resource status information, and assigns a channel identifier marking the data transmission channel; and the user plane network element sends the channel identifier to the control plane network element.

Optionally, the user plane network element sends a capability indication to the control plane network element, where the capability indication is used to indicate that the user plane network element supports a channel management capability.

Optionally, the channel management capability includes at least one of or a combination of a plurality of the following: a channel identifier assignment capability, channel detection, and channel status reporting.

Optionally, the user plane resource status information includes resource status information of at least one internal resource block of the user plane network element, and the internal resource block is represented by using an internal resource block identifier.

Optionally, the internal resource block is a hardware resource block and/or a virtual resource block.

Optionally, the user plane resource status information further includes at least one assignable channel identifier that is used to mark a data transmission channel and that corresponds to the internal resource block.

Optionally, the user plane resource status information further includes at least one assignable channel identifier that is used to mark a data transmission channel and that is of the user plane network element.

In another aspect, the control plane network element 2 in FIG. 2 may be the computer device 3 shown in FIG. 3. The processor 301 may perform another user plane resource management method provided in the present disclosure. For example, the control plane network element receives a capability indication of a user plane network element, where the capability indication is used to indicate that the user plane network element supports a channel management capability; the control plane network element sends a data transmission channel establishment request message to the user plane network element, where the data transmission channel establishment request message does not include a channel identifier, and the data transmission channel establishment request message is used to instruct the user plane network element to establish a data transmission channel; and the control plane network element receives a channel identifier sent by the user plane network element.

Optionally, the channel management capability includes at least one of or a combination of a plurality of the following: a channel identifier assignment capability, channel detection, and channel status reporting.

In still another aspect, the control plane network element 2 in FIG. 2 may be the computer device 3 shown in FIG. 3. The processor 301 may perform a user plane resource management method provided in the present disclosure. For example, the control plane network element receives a capability indication of a user plane network element, where the capability indication is used to indicate that the user plane network element does not support a channel management capability; the control plane network element sends a data transmission channel establishment request message, where the data transmission channel establishment request message includes a channel identifier, the data transmission channel establishment request message is used to instruct the user plane network element to establish a data transmission channel, and the channel identifier is used to mark the to-be-established data transmission channel.

Optionally, the channel management capability includes at least one of or a combination of a plurality of the following: a channel identifier assignment capability, channel detection, and channel status reporting.

Optionally, the channel identifier is assigned by the control plane network element based on user plane resource status information of the user plane network element.

Optionally, the user plane resource status information includes resource status information of at least one internal resource block of the user plane network element, and the internal resource block is represented by using an internal resource block identifier. The internal resource block is a hardware resource block and/or a virtual resource block. The user plane resource status information further includes at least one assignable channel identifier that is used to mark a data transmission channel and that corresponds to the internal resource block. Alternatively, the user plane resource status information further includes at least one assignable channel identifier that is used to mark a data transmission channel and that is of the user plane network element.

Optionally, the control plane network element receives a target resource block identifier that corresponds to a target resource block used to establish the data transmission channel and that is sent by the user plane network element.

Optionally, the control plane network element receives the user plane resource status information sent by the user plane network element.

Optionally, the control plane network element sends a data transmission channel suspension request message to the user plane network element, where the data transmission channel suspension request message carries the channel identifier marking the data transmission channel or the target resource block identifier of the target resource block used to establish the data transmission channel.

Optionally, the control plane network element sends a data transmission channel close request message to the user plane network element, where the data transmission channel close request message carries the channel identifier marking the data transmission channel or the target resource block identifier of the target resource block used to establish the data transmission channel.

In still another aspect, the user plane network element 1 in FIG. 2 may be the computer device 3 shown in FIG. 3.

The processor 301 may perform another user plane resource management method provided in the present disclosure. For example, the user plane network element receives a data transmission channel establishment request message sent by a control plane network element, where the establishment request message includes a channel identifier, the data transmission channel establishment request message is used to instruct the user plane network element to establish a data transmission channel, and the channel identifier is used to mark the to-be-established data transmission channel; and the user plane network element establishes the data transmission channel based on the channel identifier and current user plane resource status information, and marks the data transmission channel by using the channel identifier.

Optionally, the user plane network element sends a capability indication to the control plane network element, where the capability indication is used to indicate that the user plane network element does not support a channel management capability. The channel management capability includes at least one of or a combination of a plurality of the following: a channel identifier assignment capability, channel detection, and channel status reporting.

Optionally, the user plane resource status information includes resource status information of at least one internal resource block of the user plane network element, and the internal resource block is represented by using an internal resource block identifier. The internal resource block is a hardware resource block and/or a virtual resource block. The user plane resource status information further includes at least one assignable channel identifier that is used to mark a data transmission channel and that corresponds to the internal resource block. Alternatively, the user plane resource status information further includes at least one assignable channel identifier that is used to mark a data transmission channel and that is of the user plane network element.

Optionally, the user plane network element sends, to the control plane network element, a target resource block identifier that corresponds to a target resource block used to establish the data transmission channel.

Optionally, the user plane network element sends the user plane resource status information to the control plane network element.

Optionally, the user plane network element receives a data transmission channel suspension request message sent by the control plane network element, where the data transmission channel suspension request message carries the channel identifier marking the data transmission channel or the target resource block identifier of the target resource block used to establish the data transmission channel; and the user plane network element suspends the data transmission channel based on the channel identifier, or suspends, based on the target resource block identifier, all data transmission channels included in the target resource block.

Optionally, the user plane network element receives a data transmission channel close request message sent by the control plane network element, where the data transmission channel close request message carries the channel identifier marking the data transmission channel or the target resource block identifier of the target resource block used to establish the data transmission channel; and the user plane network element closes the data transmission channel based on the channel identifier and releases a user plane resource of the data transmission channel, or closes, based on the target resource block identifier, all data transmission channels included in the target resource block and releases a user plane resource of all the data transmission channels.

Figure 4:
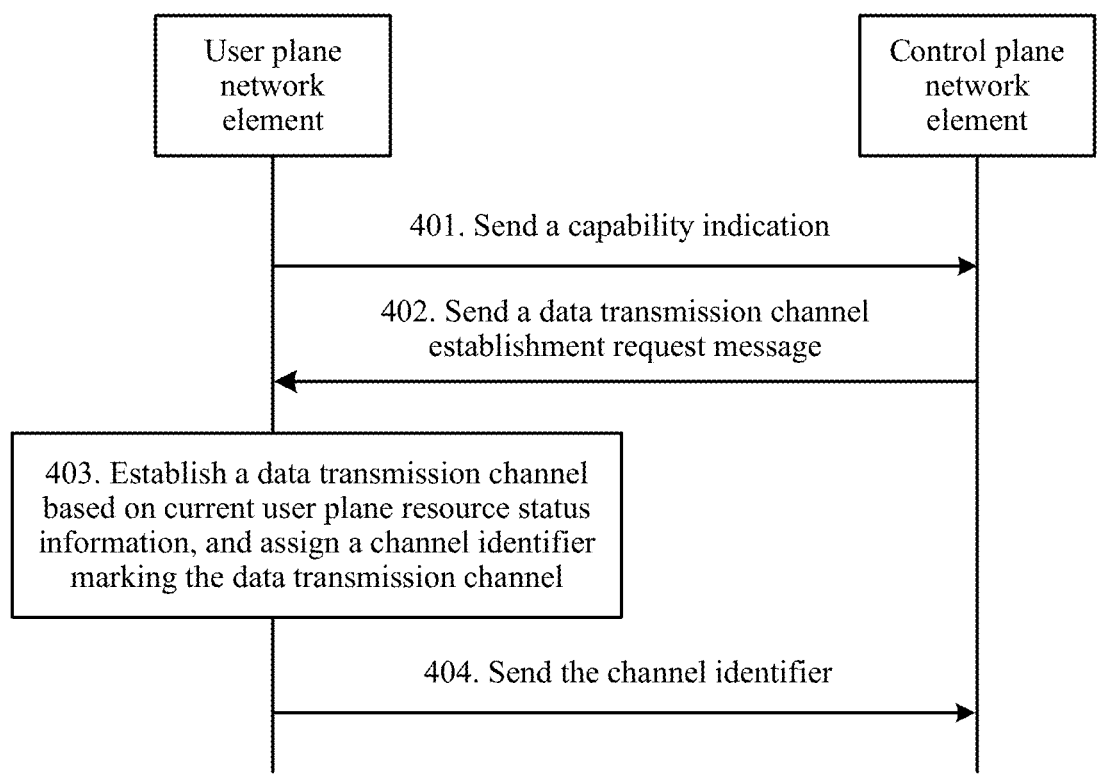
FIG. 4 is a schematic flowchart of a user plane resource management method according to an embodiment of the present disclosure.
Figure 5:
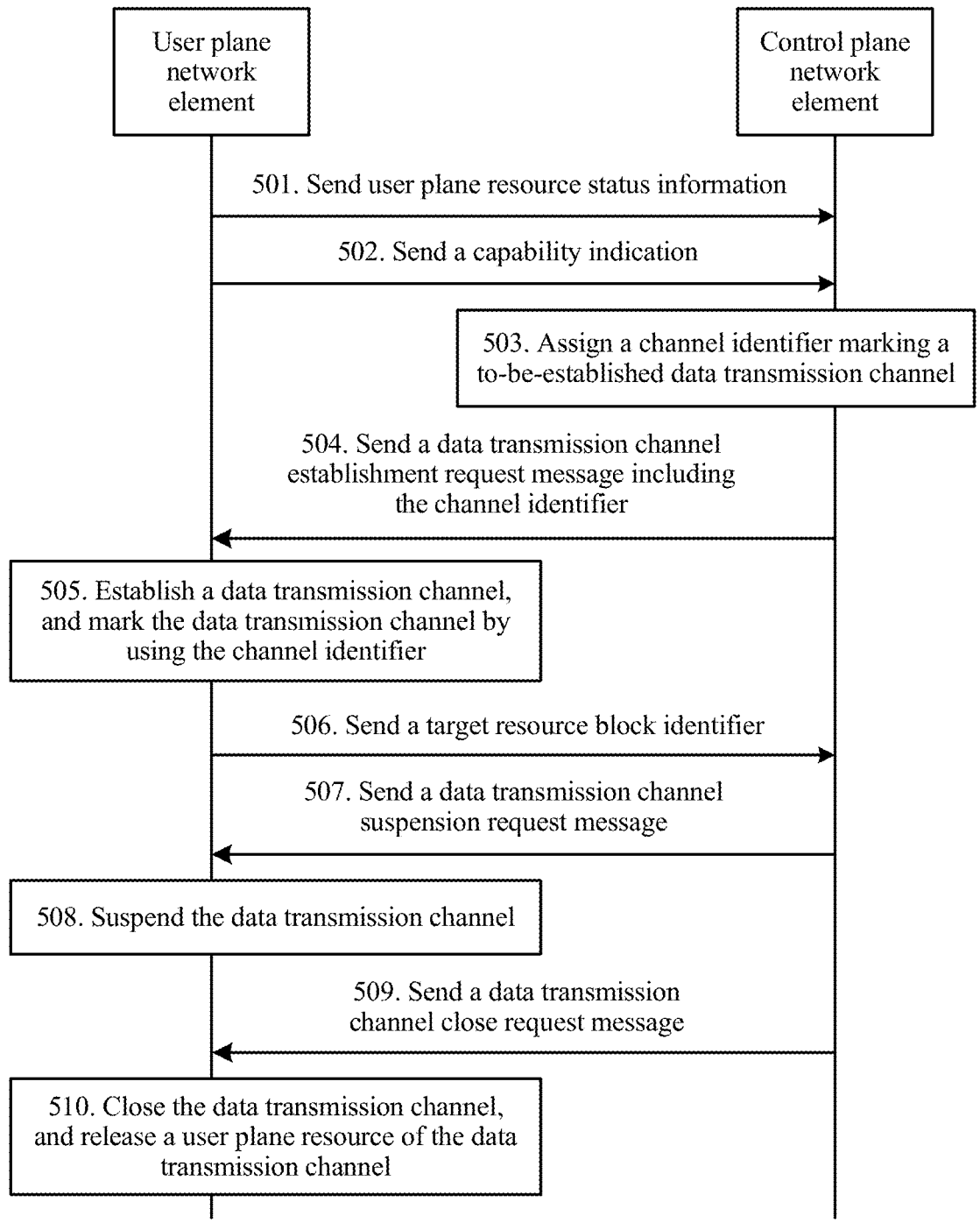
FIG. 5 is a schematic flowchart of another user plane resource management method according to an embodiment of the present disclosure.

For the foregoing descriptions of steps performed by the processors in the user plane network element 1 and the control plane network element 2 having the structure shown in FIG. 3 above, refer to detailed descriptions of corresponding steps in embodiments shown in FIG. 4 and FIG. 5, and details are not described herein.

FIG. 4 is a schematic flowchart of a user plane resource management method according to an embodiment of the present disclosure. As shown in FIG. 4, the method in this embodiment of the present disclosure may include the following step 401 to step 404.

401. A user plane network element sends a capability indication to a control plane network element, where the capability indication is used to indicate that the user plane network element supports a channel management capability.

Specifically, the user plane network element sends the capability indication to the control plane network element, where the capability indication is used to indicate that the user plane network element supports the channel management capability. In all the embodiments of the present disclosure, the channel management capability includes at least one of or a combination of a plurality of the following: a data transmission channel assignment capability, a channel detection capability, channel status management, and a channel abnormality processing capability.

Specifically, the data channel assignment capability is assigning a data channel identifier. A channel status includes: detecting whether a channel is alive. This may be sending a message to a peer end, and determining whether the peer end is reachable. The channel abnormality processing capability includes: when it is determined that a channel is unavailable, sending a report to a control plane for processing, or deleting the channel and sending a report to a control plane.

It should be specially noted that there may be a plurality of manners in which a user plane indicates a capability to the control plane. A manner of carrying an information element and using a specific value may be used. For example, 0 represents "not support", and 1 represents "support". Alternatively, a manner of determining whether a particular information element is included may be used. For example, including an information element of the channel management capability indicates "support"; or skipping including an information element of the channel management capability indicates "not support". This is not limited in the present disclosure.

Correspondingly, the control plane network element receives the capability indication of the user plane network element.

402. The control plane network element sends a data transmission channel establishment request message to the user plane network element.

Specifically, the control plane network element sends the data transmission channel establishment request message to the user plane network element, where the data transmission channel establishment request message does not include a channel identifier, and the data transmission channel establishment request message is used to instruct the user plane network element to establish a data transmission channel. In a feasible solution, the data transmission channel establishment request message carries a resource requirement, for example, a requirement for a 100M bandwidth.

For example, sending the data transmission channel establishment message may be triggered by the control plane network element. For example, when the control plane network element detects that a bandwidth of a current data transmission channel of a service does not match a data amount generated by the service, the control plane network element triggers the sending the data transmission channel establishment request message. For another example, the data transmission channel establishment message may be sent by a terminal or a service server, and the control plane network element forwards the data transmission channel establishment message to the user plane network element.

Correspondingly, the user plane network element receives the data transmission channel establishment request message sent by the control plane network element.

403. The user plane network element establishes the data transmission channel based on current user plane resource status information, and assigns a channel identifier marking the data transmission channel.

Specifically, the user plane network element establishes the data transmission channel based on the current user plane resource status information, and assigns the channel identifier marking the data transmission channel. In a feasible solution, the user plane network element establishes the data transmission channel based on idle resource information that is of a plurality of internal resource blocks and that is included in the user plane resource status information. For example, an internal resource block that can meet a resource requirement carried in the data transmission channel establishment request message is selected from the idle resource information, and one channel identifier in one or more channel identifiers corresponding to the selected internal resource block is assigned to mark the data transmission channel. Optionally, the user plane network element may select, based on a load balancing principle, a target resource block having a relatively low resource occupation rate from a plurality of internal resource blocks that can meet a condition, to establish the data transmission channel.

In a feasible solution, the user plane resource status information includes resource status information of at least one internal resource block of the user plane network element. Optionally, the internal resource block includes a hardware resource block and/or a virtual resource block. For example, the hardware resource block may be a physical board, and the virtual resource block may be a virtual machine obtained after the physical board is virtualized based on a virtualization technology. This is merely an example description. This embodiment of the present disclosure does not limit names of the hardware resource block and/or the virtual resource block. An internal resource block in any form may be represented by using an internal resource block identifier, for example, a physical board A and a virtual machine 5.

In a feasible solution, in addition to the resource status information of the at least one internal resource block of the user plane network element, the user plane resource status information further includes at least one assignable channel identifier that is used to mark a data transmission channel and that corresponds to each of the at least one internal resource block, in other words, one internal resource block corresponds to one or more assignable channel identifiers. For example, assignable channel identifiers corresponding to the virtual machine 5 in the user plane network element are 51, 52, and 53.

In a feasible solution, in addition to the resource status information of the at least one internal resource block of the user plane network element, the user plane resource status information further includes at least one assignable channel identifier that is used to mark a data transmission channel and that is of the user plane network element. The channel identifier herein may be assigned based on any internal resource block included in the user plane network element.

Further, the resource status information of the at least one internal resource block in this embodiment of the present disclosure may be idle resource information, a resource occupation rate, and the like of the at least one internal resource block. In a feasible solution, a resource involved in this embodiment of the present disclosure may be a bandwidth resource, a memory resource, and the like. This embodiment of the present disclosure does not limit a resource type in the user plane resource status information.

404. The user plane network element sends the channel identifier to the control plane network element.

Specifically, the user plane network element sends the channel identifier to the control plane network element, to notify the control plane network element of the assigned channel identifier.

Correspondingly, the control plane network element receives the channel identifier sent by the user plane network element.

In a possible embodiment, the user plane network element sends the user plane resource status information to the control plane network element.

In a possible embodiment, the user plane network element sends, to the control plane network element, a target resource block identifier that corresponds to a target resource block used to establish the data transmission channel. Specifically, in the at least one internal resource block of the user plane network element, if the user plane resource status information includes the resource status information of the at least one internal resource block and the at least one assignable channel identifier that is used to mark a data transmission channel and that is of the user plane network element, the channel identifier assigned by the user plane network element to mark the data transmission channel does not correspond to an internal resource block identifier. Therefore, the user plane network element sends, to the control plane network element, the target resource block identifier that corresponds to the target resource block used to establish the data transmission channel. The target resource block is a resource block that is selected by the user plane network element from the at least one internal resource block to establish the data transmission channel, to update the resource status information stored in the control plane network element. Correspondingly, the control plane network element receives the target resource block identifier that corresponds to the target resource block used to establish the data transmission channel and that is sent by the user plane network element. Optionally, the control plane network element may update resource status information of the target resource block based on the target resource block identifier.

In a possible embodiment, the control plane network element sends a data transmission channel suspension request message to the user plane network element. Specifically, the control plane network element sends the data transmission channel suspension request message to the user plane network element, where the data transmission channel suspension request message carries the channel identifier marking the data transmission channel or the target resource block identifier of the target resource block used to establish the data transmission channel. Correspondingly, the user plane network element receives the data transmission channel suspension request message sent by the control plane network element.

In a possible embodiment, the user plane network element suspends the data transmission channel based on the channel identifier, or suspends, based on the target resource block identifier, all data transmission channels included in the target resource block.

In a possible embodiment, the control plane network element sends a data transmission channel close request message to the user plane network element. Specifically, the control plane network element sends the data transmission channel close request message to the user plane network element, where the data transmission channel close request message carries the channel identifier marking the data transmission channel or the target resource block identifier of the target resource block used to establish the data transmission channel. Correspondingly, the user plane network element receives the data transmission channel close request message sent by the control plane network element.

In a possible embodiment, the user plane network element closes the data transmission channel based on the channel identifier and releases a user plane resource of the data transmission channel, or closes, based on the target resource block identifier, all data transmission channels included in the target resource block and releases a user plane resource of all the data transmission channels.

Some possibly existing embodiments in the present disclosure are briefly described above. For details, refer to detailed descriptions of same steps in the embodiments of the present disclosure. A description herein is merely an example instead of all possibly existing embodiments. Other embodiments generated through operations such as adjusting a step sequence, combining steps, and deleting steps also belong to the protection scope of the embodiments of the present disclosure.

It can be learned that in this embodiment of the present disclosure, after receiving the data transmission channel establishment request message sent by the control plane network element, the user plane network element can establish the data transmission channel based on the current user plane resource status information, and assign the channel identifier marking the data transmission channel, to effectively manage user plane resources.

FIG. 5 is a schematic flowchart of a user plane resource management method according to an embodiment of the present disclosure. As shown in FIG. 5, the method in this embodiment of the present disclosure may include the following step 501 to step 510.

501. A user plane network element sends user plane resource status information to a control plane network element.

Specifically, the user plane network element sends the user plane resource status information to the control plane network element. In a feasible solution, the user plane resource status information includes resource status information of at least one internal resource block of the user plane network element. Optionally, the internal resource block includes a hardware resource block and/or a virtual resource block. For example, the hardware resource block may be a physical board, and the virtual resource block may be a virtual machine obtained after the physical board is virtualized based on a virtualization technology. This is merely an example description. This embodiment of the present disclosure does not limit names of the hardware resource block and/or the virtual resource block. An internal resource block in any form may be represented by using an internal resource block identifier, for example, a physical board A and a virtual machine 5.

In a feasible solution, in addition to the resource status information of the at least one internal resource block of the user plane network element, the user plane resource status information further includes at least one assignable channel identifier that is used to mark a data transmission channel and that corresponds to each of the at least one internal resource block, in other words, one internal resource block corresponds to one or more assignable channel identifiers. For example, assignable channel identifiers corresponding to the virtual machine 5 in the user plane network element are 51, 52, and 53.

In a feasible solution, in addition to the resource status information of the at least one internal resource block of the user plane network element, the user plane resource status information further includes at least one assignable channel identifier that is used to mark a data transmission channel and that is of the user plane network element. The channel identifier herein may be assigned based on any internal resource block included in the user plane network element.

Further, the resource status information of the at least one internal resource block in this embodiment of the present disclosure may be idle resource information, a resource occupation rate, and the like of the at least one internal resource block. In a feasible solution, a resource involved in this embodiment of the present disclosure may be a bandwidth resource, a memory resource, and the like. This embodiment of the present disclosure does not limit a resource type in the user plane resource status information.

Correspondingly, the control plane network element receives the user plane resource status information sent by the user plane network element.

502. The user plane network element sends a capability indication to the control plane network element.

Specifically, the user plane network element sends the capability indication to the control plane network element, where the capability indication is used to indicate that the user plane network element supports a channel management capability. In all the embodiments of the present disclosure, the channel management capability includes at least one of or a combination of a plurality of the following: a data transmission channel assignment capability, a channel detection capability, channel status management, and a channel abnormality processing capability.

Specifically, the data channel assignment capability is assigning a data channel identifier. A channel status includes: detecting whether a channel is alive. This may be sending a message to a peer end, and determining whether the peer end is reachable. The channel abnormality processing capability includes: when it is determined that a channel is unavailable, sending a report to a control plane for processing, or deleting the channel and sending a report to a control plane.

It should be specially noted that there may be a plurality of manners in which a user plane indicates a capability to the control plane. A manner of carrying an information element and using a specific value may be used. For example, 0 represents "not support", and 1 represents "support". Alternatively, a manner of determining whether a particular information element is included may be used. For example, including an information element of the channel management capability indicates "support"; or skipping including an information element of the channel management capability indicates "not support". This is not limited in the present disclosure.

Correspondingly, the control plane network element receives the capability indication sent by the user plane network element.

In a feasible solution, the user plane network element may send the user plane resource status information in step 501 together with the capability indication in step 502 to the control plane network element. If the user plane resource status information in step 501 and the capability indication in step 502 are separately sent, this embodiment of the present disclosure does not limit a sending sequence.

503. The control plane network element assigns, based on the user plane resource status information of the user plane network element, a channel identifier marking a to-be-established data transmission channel.

Specifically, the channel identifier is assigned by the control plane network element based on the user plane resource status information of the user plane network element. The control plane network element assigns, based on the user plane resource status information of the user plane network element, the channel identifier marking the to-be-established data transmission channel. In a feasible solution, the user plane resource status information carries a channel identifier, the control plane network element selects a channel identifier from the user plane resource status information and assigns the channel identifier, and the assigned channel identifier is used to mark the to-be-established data transmission channel. It may be understood that the to-be-established data transmission channel is established by the user plane network element.

For example, the to-be-established data transmission channel may be triggered by the control plane network element. For example, when the control plane network element detects that a bandwidth of a current data transmission channel of a service does not match a data amount generated by the service, the control plane network element triggers assigning the channel identifier to the to-be-established data transmission channel. For another example, a data transmission channel establishment message may be sent by a terminal or a service server, and the control plane network element forwards the data transmission channel establishment message to the user plane network element.

504. The control plane network element sends a data transmission channel establishment request message to the user plane network element.

Specifically, the control plane network element sends the data transmission channel establishment request message to the user plane network element, where the data transmission channel establishment request message includes the channel identifier, the data transmission channel establishment request message is used to instruct the user plane network element to establish a data transmission channel, and the channel identifier is used to mark the to-be-established data transmission channel.

Correspondingly, the user plane network element receives the data transmission channel establishment request message that carries the channel identifier and that is sent by the control plane network element.

505. The user plane network element establishes a data transmission channel based on the data transmission channel identifier, and marks the data transmission channel by using the channel identifier.

Specifically, the user plane network element establishes the data transmission channel based on current user plane resource status information, and marks the data transmission channel by using the channel identifier. In a feasible solution, the user plane network element establishes the data transmission channel based on idle resource information that is of a plurality of internal resource blocks and that is included in the user plane resource status information. For example, an internal resource block that can meet a resource requirement carried in the data transmission channel establishment request message is selected from the idle resource information, and the established data transmission channel is marked by using the channel identifier carried in the data transmission channel establishment request message. Optionally, the user plane network element may select, based on a load balancing principle, a target resource block having a relatively low resource occupation rate from a plurality of internal resource blocks that can meet a condition, to establish the data transmission channel.

In a feasible solution, after establishing the data transmission channel, the user plane network element may update the user plane resource status information of the user plane network element. For example, the user plane network element updates the target resource block that is used to establish the data transmission channel and that is in the user plane resource status information, or updates the channel identifier to an assigned state. Further, the user plane network element may send the updated user plane resource status information to the control plane network element, so that the control plane network element learns of the latest user plane resource status information.

506. The control plane network element sends, to the user plane network element, a target resource block identifier that corresponds to a target resource block used to establish the data transmission channel.

Specifically, if the user plane resource status information includes the resource status information of the at least one internal resource block, and includes the at least one assignable channel identifier that is used to mark a data transmission channel and that is of the user plane network element, the channel identifier assigned by the control plane network element to mark the data transmission channel does not correspond to an internal resource block identifier. Therefore, the target resource block identifier corresponding to the target resource block used to establish the data transmission channel is sent to the control plane network element, where the target resource block is a resource block selected by the user plane network element from the at least one internal resource block to establish the data transmission channel, to update resource status information stored in the user plane network element.

Correspondingly, the user plane network element receives the target resource block identifier that corresponds to the target resource block used to establish the data transmission channel and that is sent by the control plane network element. Optionally, the user plane network element may update the resource status information of the target resource block based on the target resource block identifier.

507. The control plane network element sends a data transmission channel suspension request message to the user plane network element.

Specifically, the control plane network element sends the data transmission channel suspension request message to the user plane network element, where the data transmission channel suspension request message carries the channel identifier marking the data transmission channel or the target resource block identifier of the target resource block used to establish the data transmission channel.

Correspondingly, the user plane network element receives the data transmission channel suspension request message sent by the control plane network element.

508. The user plane network element suspends the data transmission channel based on the channel identifier, or suspends, based on the target resource block identifier, all data transmission channels included in the target resource block.

Specifically, when the data transmission channel suspension request message carries the channel identifier, the user plane network element searches for, based on the channel identifier and the stored user plane resource status information, an internal resource block identifier corresponding to the channel identifier, and further suspends the data transmission channel corresponding to the channel identifier in an internal resource block having the found internal resource block identifier, to indicate that the suspended data transmission channel is temporarily not used for data transmission. In a feasible solution, the user plane network element may receive a data transmission channel resumption message sent by the control plane network element, to resume a data transmission function of the data transmission channel.

When the data transmission channel suspension request message carries the target resource block identifier, the user plane network element searches for, based on the target resource block identifier, the target resource block marked by the target resource block identifier, and suspends all the data transmission channels included in the target resource block. In a feasible solution, the user plane network element may receive a data transmission channel resumption message sent by the control plane network element, to resume a data transmission function of the data transmission channel.

509. The control plane network element sends a data transmission channel close request message to the user plane network element.

Specifically, the control plane network element sends the data transmission channel close request message to the user plane network element, where the data transmission channel close request message carries the channel identifier marking the data transmission channel or the target resource block identifier of the target resource block used to establish the data transmission channel.

Correspondingly, the user plane network element receives the data transmission channel close request message sent by the control plane network element.

510. The user plane network element closes the data transmission channel based on the channel identifier and releases a user plane resource of the data transmission channel, or closes, based on the target resource block identifier, all data transmission channels included in the target resource block and releases a user plane resource of all the data transmission channels.

Specifically, when the data transmission channel close request message carries the channel identifier, the user plane network element searches for, based on the channel identifier and the stored user plane resource status information, an internal resource block identifier corresponding to the channel identifier, and further closes the data transmission channel corresponding to the channel identifier in an internal resource block having the found internal resource block identifier, and releases the user plane resource of the data transmission channel, to indicate that the closed data transmission channel can be reassigned. Therefore, resource status information corresponding to the channel identifier corresponding to the closed data transmission channel may be updated in the user plane resource status information.

When the data transmission channel close request message carries the target resource block identifier, the user plane network element searches for, based on the target resource block identifier, the target resource block marked by the target resource block identifier, closes all the data transmission channels included in the target resource block, and releases the user plane resource of all the data transmission channels, to further indicate that all the closed data transmission channels in the target resource block can be reassigned. Therefore, resource status information corresponding to all the closed data transmission channels included in the target resource block may be updated in the user plane resource status information.

It should be noted that for step 507 to step 510, the user plane resource status information may further include a data transmission status of at least one internal data block, or a data transmission status of the data transmission channel. The data transmission status herein may include a state in which data transmission is started, a state in which data transmission is suspended, and an idle state in which a data transmission channel can be used at any time. In a feasible solution, each data transmission state may be represented by using a data transmission state identifier. For example, 01, 10, 11 may be respectively used to represent the foregoing three states. In addition, in the user plane resource status information, an internal resource block identifier and a data transmission status identifier may be stored correspondingly, or a channel identifier and a data transmission channel identifier may be stored correspondingly, or all channel identifiers in an internal resource block identifier and a data transmission channel identifier corresponding to each channel identifier may be stored correspondingly. Further, when the user plane resource status information is changed, the user plane network element sends changed user plane resource status information to the control plane network element, or sends, to the control plane network element, information indicating that the user plane resource status information is changed.

In this embodiment of the present disclosure, step 503, step 504, and step 505 are necessary steps, and the other steps are optional steps. Optionally, the foregoing necessary steps may be combined with step 502 to generate an embodiment. In this way, for a user plane network element that cannot establish a data transmission channel, the control plane network element may reduce, by using a capability indication, occurrence of a case in which a data transmission channel establishment request message is refused. Further, when there are a plurality of user plane network elements, the control plane network element may select, based on a received capability indication, a user plane network element that can establish a data transmission channel, and send a data transmission channel establishment request message to the user plane network element. Therefore, accuracy of sending a data transmission channel establishment request message can be improved through sending a capability indication.

Optionally, the foregoing necessary steps may be combined with step 501 and step 506 to generate an embodiment. In this embodiment, the control plane network element receives user plane resource status information sent by the user plane network element, and assigns a channel identifier of a to-be-established data transmission channel based on a real-time case of the user plane resource status information, so that the control plane network element effectively manages user plane resources. For example, in a scenario in which there are a plurality of user plane network elements, the control plane network element may select a user plane network element based on a load balancing principle and based on user plane resource status information of each user plane network element, and assign a channel identifier of a to-be-established data transmission channel. Further, under the premise that the control plane network element learns of the user plane resource status information of the user plane network element, the control plane network element may perform step 507 or step 509, and correspondingly, the user plane network element performs a corresponding step based on received information. For example, in a scenario in which there are a plurality of user plane network elements, the control plane network element may learn of a resource occupation rate of each user plane network element by using user plane resource status information. For a first user plane network element having a resource occupation rate greater than a preset value, the control plane network element may migrate a data transmission channel of a particular service in the first user plane network element to a second user plane network element having a relatively low resource occupation rate, and may implement migration by sending a data transmission channel close request message to the first user plane network element and sending a data transmission channel establishment request message to the second user plane network element. In this way, the control plane network element can manage the plurality of user plane network elements in a load balancing manner.

Some possibly existing embodiments in the present disclosure are briefly described above. For details, refer to detailed descriptions of same steps in the embodiments of the present disclosure. A description herein is merely an example instead of all possibly existing embodiments. Other embodiments generated through operations such as adjusting a step sequence, combining steps, and deleting steps also belong to the protection scope of the embodiments of the present disclosure.

It can be learned that in this embodiment of the present disclosure, the control plane network element can assign the channel identifier of the to-be-established data transmission channel based on the user plane resource status information sent by the user plane network element, instruct the user plane network element to establish the data transmission channel, and mark the established data transmission channel by using the channel identifier assigned by the control plane network element. Therefore, the control plane network element can effectively manage user plane resources.

Figure 6:
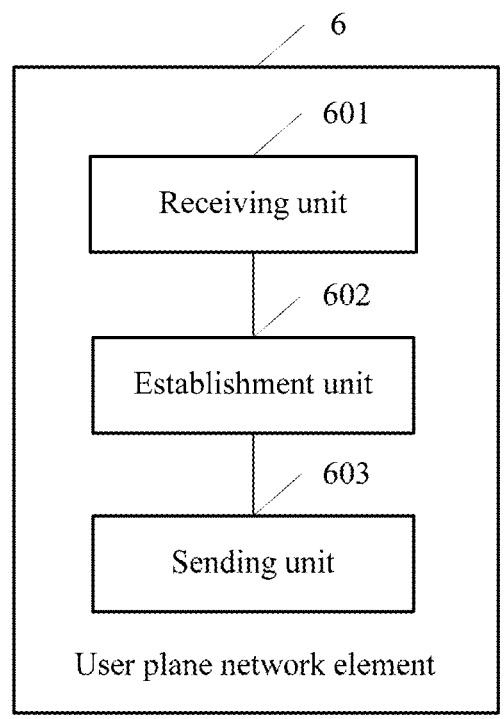
FIG. 6 is a schematic structural diagram of a user plane network element according to an embodiment of the present disclosure.

FIG. 6 is a schematic structural diagram of a user plane network element according to an embodiment of the present disclosure. The user plane network element in this embodiment of the present disclosure may be the user plane network element provided in any embodiment of FIG. 2 to FIG. 4. As shown in FIG. 6, the user plane network element 6 in this embodiment of the present disclosure may include a receiving unit 601, an establishment unit 602, and a sending unit 603.

The receiving unit 601 is configured to receive a data transmission channel establishment request message sent by a control plane network element, where the data transmission channel establishment request message is used to instruct the user plane network element to establish a data transmission channel.

The establishment unit 602 is configured to: establish the data transmission channel based on current user plane resource status information, and assign a channel identifier marking the data transmission channel.

The sending unit 603 is configured to send the channel identifier to the control plane network element.

In a possible embodiment, the sending unit 603 is further configured to send a capability indication to the control plane network element, where the capability indication is used to indicate that the user plane network element supports a channel management capability.

In a possible embodiment, the channel management capability includes at least one of or a combination of a plurality of the following: a channel identifier assignment capability, channel detection, and channel status reporting.

In a possible embodiment, the user plane resource status information includes resource status information of at least one internal resource block of the user plane network element, and the internal resource block is represented by using an internal resource block identifier.

In a possible embodiment, the internal resource block is a hardware resource block and/or a virtual resource block.

In a possible embodiment, the user plane resource status information further includes at least one assignable channel identifier that is used to mark a data transmission channel and that corresponds to the internal resource block.

In a possible embodiment, the user plane resource status information further includes at least one assignable channel identifier that is used to mark a data transmission channel and that is of the user plane network element.

It should be noted that functions of functional units in the user plane network element 6 described in this embodiment of the present disclosure may be specifically implemented based on the method in the method embodiment shown in FIG. 4, and details are not described herein again.

In this embodiment, the user plane network element 6 may be presented in a form of a functional unit. The "unit" herein may refer to an application-specific integrated circuit (ASIC), a circuit, a processor that executes one or more software or firmware programs and a memory, an integrated logic circuit, and/or another device that can provide the foregoing functions. In a simple embodiment, a person skilled in the art may figure out that the user plane network element 6 can be implemented in a form shown in FIG. 3.

An embodiment of the present disclosure further provides a computer storage medium, configured to store a computer software instruction used by the user plane network element shown in FIG. 6, where the computer software instruction includes a program designed for performing the foregoing method embodiment. The stored program is executed, so that user plane resources can be effectively managed.

Figure 7:
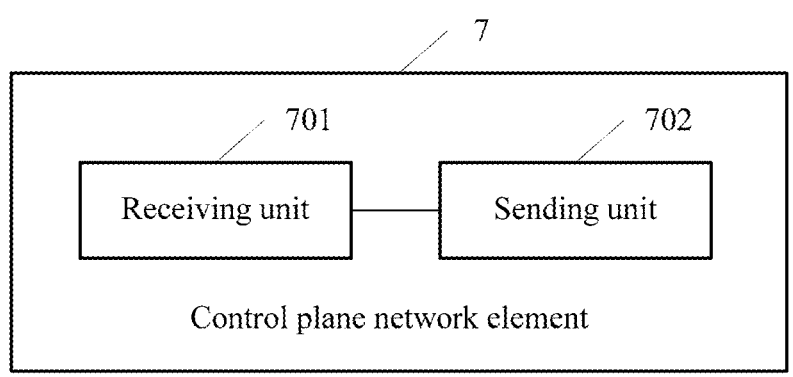
FIG. 7 is a schematic structural diagram of a control plane network element according to an embodiment of the present disclosure.

FIG. 7 is a schematic structural diagram of a control plane network element according to an embodiment of the present disclosure. The control plane network element in this embodiment of the present disclosure may be the control plane network element provided in any embodiment of FIG. 2 to FIG. 4. As shown in FIG. 7, the control plane network element 7 in this embodiment of the present disclosure may include a sending unit 701 and a receiving unit 702.

The receiving unit 701 is configured to receive a capability indication of a user plane network element, where the capability indication is used to indicate that the user plane network element supports a channel management capability.

The sending unit 702 is configured to send a data transmission channel establishment request message to the user plane network element, where the data transmission channel establishment request message does not include a channel identifier, and the data transmission channel establishment request message is used to instruct the user plane network element to establish a data transmission channel.

The receiving unit 701 is further configured to receive a channel identifier sent by the user plane network element.

In a possible embodiment, the channel management capability includes at least one of or a combination of a plurality of the following: a channel identifier assignment capability, channel detection, and channel status reporting.

It should be noted that functions of functional units in the control plane network element 7 described in this embodiment of the present disclosure may be specifically implemented based on the method in the method embodiment shown in FIG. 4, and details are not described herein again.

In this embodiment, the control plane network element 7 may be presented in a form of a functional unit. The "unit" herein may refer to an application-specific integrated circuit (ASIC), a circuit, a processor that executes one or more software or firmware programs and a memory, an integrated logic circuit, and/or another device that can provide the foregoing functions. In a simple embodiment, a person skilled in the art may figure out that the control plane network element 7 can be implemented in a form shown in FIG. 3.

An embodiment of the present disclosure further provides a computer storage medium, configured to store a computer software instruction used by the control plane network element shown in FIG. 7, where the computer software instruction includes a program designed for performing the foregoing method embodiment. The stored program is executed, so that user plane resources can be effectively managed.

Figure 8:
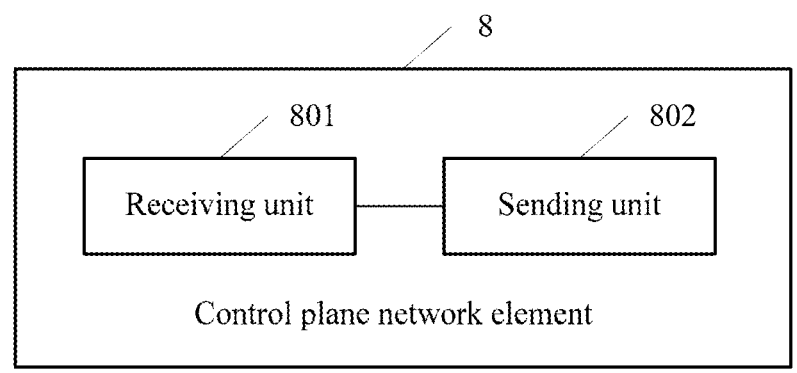
FIG. 8 is a schematic structural diagram of another control plane network element according to an embodiment of the present disclosure.

FIG. 8 is a schematic structural diagram of a control plane network element according to an embodiment of the present disclosure. The control plane network element in this embodiment of the present disclosure may be the control plane network element provided in any embodiment of FIG. 2, FIG. 3, and FIG. 5. As shown in FIG. 8, the control plane network element 8 in this embodiment of the present disclosure may include a receiving unit 801 and a sending unit 802.

The receiving unit 801 is configured to receive a capability indication of a user plane network element, where the capability indication is used to indicate that the user plane network element does not support a channel management capability.

The sending unit 802 is configured to send a data transmission channel establishment request message, where the data transmission channel establishment request message includes a channel identifier, the data transmission channel establishment request message is used to instruct the user plane network element to establish a data transmission channel, and the channel identifier is used to mark the to-be-established data transmission channel.

In a possible embodiment, the channel management capability includes at least one of or a combination of a plurality of the following: a channel identifier assignment capability, channel detection, and channel status reporting.

In a possible embodiment, the channel identifier is assigned by the control plane network element based on user plane resource status information of the user plane network element.

In a possible embodiment, the user plane resource status information includes resource status information of at least one internal resource block of the user plane network element, and the internal resource block is represented by using an internal resource block identifier.

In a possible embodiment, the internal resource block is a hardware resource block and/or a virtual resource block.

In a possible embodiment, the user plane resource status information further includes at least one assignable channel identifier that is used to mark a data transmission channel and that corresponds to the internal resource block.

In a possible embodiment, the user plane resource status information further includes at least one assignable channel identifier that is used to mark a data transmission channel and that is of the user plane network element.

In a possible embodiment, the receiving unit 801 is further configured to receive a target resource block identifier that corresponds to a target resource block used to establish the data transmission channel and that is sent by the user plane network element.

In a possible embodiment, the receiving unit 801 is further configured to receive the user plane resource status information sent by the user plane network element.

In a possible embodiment, the sending unit 802 is further configured to send a data transmission channel suspension request message to the user plane network element, where the data transmission channel suspension request message carries the channel identifier marking the data transmission channel or the target resource block identifier of the target resource block used to establish the data transmission channel.

In a possible embodiment, the sending unit 802 is further configured to send a data transmission channel close request message to the user plane network element, where the data transmission channel close request message carries the channel identifier marking the data transmission channel or the target resource block identifier of the target resource block used to establish the data transmission channel.

It should be noted that functions of functional units in the control plane network element 8 described in this embodiment of the present disclosure may be specifically implemented based on the method in the method embodiment shown in FIG. 5, and details are not described herein again.

In this embodiment, the control plane network element 8 may be presented in a form of a functional unit. The "unit" herein may refer to an application-specific integrated circuit (ASIC), a circuit, a processor that executes one or more software or firmware programs and a memory, an integrated logic circuit, and/or another device that can provide the foregoing functions. In a simple embodiment, a person skilled in the art may figure out that the control plane network element 8 can be implemented in a form shown in FIG. 3.

An embodiment of the present disclosure further provides a computer storage medium, configured to store a computer software instruction used by the control plane network element shown in FIG. 8, where the computer software instruction includes a program designed for performing the foregoing method embodiment. The stored program is executed, so that user plane resources can be effectively managed.

Figure 9:
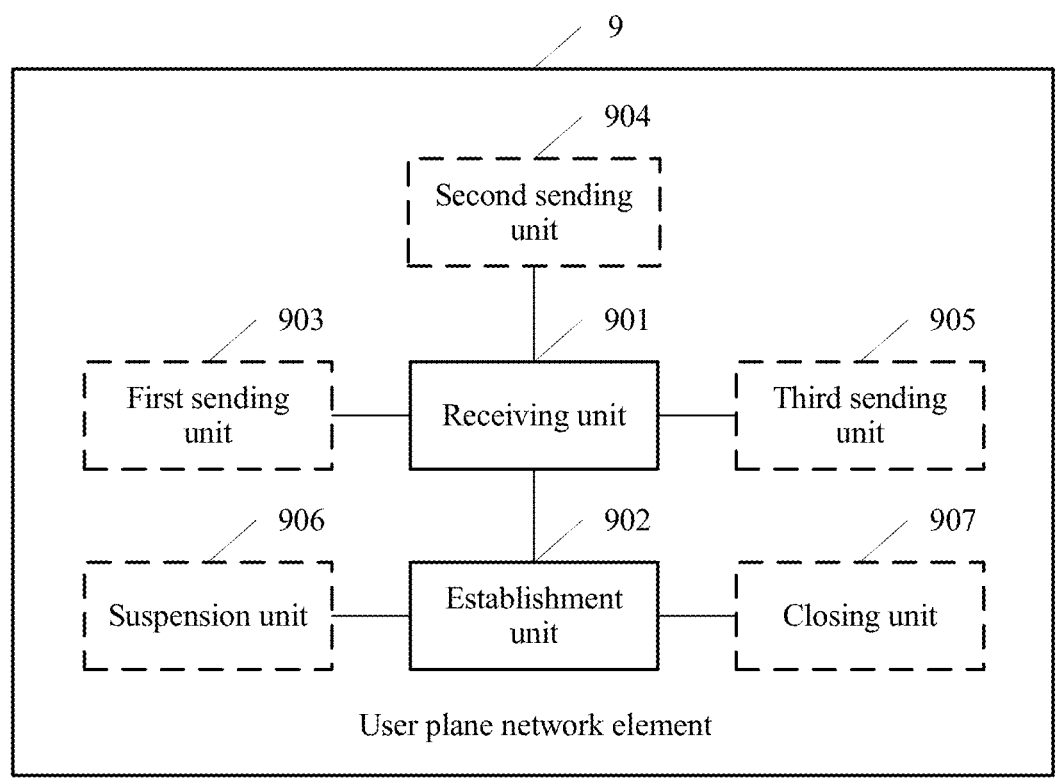
FIG. 9 is a schematic structural diagram of another user plane network element according to an embodiment of the present disclosure.

FIG. 9 is a schematic structural diagram of a user plane network element according to an embodiment of the present disclosure. The user plane network element in this embodiment of the present disclosure may be the user plane network element provided in any embodiment of FIG. 2, FIG. 3, and FIG. 5. As shown in FIG. 9, the user plane network element 9 in this embodiment of the present disclosure may include a receiving unit 901 and an establishment unit 902. Optionally, the user plane network element 9 further includes a first sending unit 903, a second sending unit 904, a third sending unit 905, a suspension unit 906, and/or a closing unit 907.

The receiving unit 901 is configured to receive a data transmission channel establishment request message sent by a control plane network element, where the establishment request message includes a channel identifier, the data transmission channel establishment request message is used to instruct the user plane network element to establish a data transmission channel, and the channel identifier is used to mark the to-be-established data transmission channel.

The establishment unit 902 is configured to: establish the data transmission channel based on the channel identifier and current user plane resource status information, and mark the data transmission channel by using the channel identifier.

In a possible embodiment, the user plane network element further includes the first sending unit 903.

The first sending unit 903 is configured to send a capability indication to the control plane network element, where the capability indication is used to indicate that the user plane network element does not support a channel management capability.

In a possible embodiment, the channel management capability includes at least one of or a combination of a plurality of the following: a channel identifier assignment capability, channel detection, and channel status reporting.

In a possible embodiment, the user plane resource status information includes resource status information of at least one internal resource block of the user plane network element, and the internal resource block is represented by using an internal resource block identifier.

In a possible embodiment, the internal resource block is a hardware resource block or a virtual resource block.

In a possible embodiment, the user plane resource status information further includes at least one assignable channel identifier that is used to mark a data transmission channel and that corresponds to the internal resource block.

In a possible embodiment, the user plane resource status information further includes at least one assignable channel identifier that is used to mark a data transmission channel and that is of the user plane network element.

In a possible embodiment, the user plane network element further includes the second sending unit 904.

The second sending unit 904 is configured to send, to the control plane network element, a target resource block identifier that corresponds to a target resource block used to establish the data transmission channel.

In a possible embodiment, the user plane network element further includes the third sending unit 905.

The third sending unit 905 is configured to send the user plane resource status information to the control plane network element.

In a possible embodiment, the user plane network element further includes the suspension unit 906.

The receiving unit 901 is configured to receive a data transmission channel suspension request message sent by the control plane network element, where the data transmission channel suspension request message carries the channel identifier marking the data transmission channel or the target resource block identifier of the target resource block used to establish the data transmission channel.

The suspension unit 906 is configured to: suspend the data transmission channel based on the channel identifier, or suspend, based on the target resource block identifier, all data transmission channels included in the target resource block.

In a possible embodiment, the user plane network element further includes the closing unit 907.

The receiving unit 901 is configured to receive a data transmission channel close request message sent by the control plane network element, where the data transmission channel close request message carries the channel identifier marking the data transmission channel or the target resource block identifier of the target resource block used to establish the data transmission channel.

The closing unit 907 is configured to: close the data transmission channel based on the channel identifier and release a user plane resource of the data transmission channel, or close, based on the target resource block identifier, all data transmission channels included in the target resource block and release a user plane resource of all the data transmission channels.

It should be noted that functions of functional units in the user plane network element 9 described in this embodiment of the present disclosure may be specifically implemented based on the method in the method embodiment shown in FIG. 4, and details are not described herein again.

In this embodiment, the user plane network element 9 may be presented in a form of a functional unit. The "unit" herein may refer to an application-specific integrated circuit (ASIC), a circuit, a processor that executes one or more software or firmware programs and a memory, an integrated logic circuit, and/or another device that can provide the foregoing functions. In a simple embodiment, a person skilled in the art may figure out that the user plane network element 9 can be implemented in a form shown in FIG. 3.

An embodiment of the present disclosure further provides a computer storage medium, configured to store a computer software instruction used by the user plane network element shown in FIG. 9, where the computer software instruction includes a program designed for performing the foregoing method embodiment. The stored program is executed, so that user plane resources can be effectively managed.

An embodiment of the present disclosure further provides another computer storage medium, configured to store a computer software instruction used by the user plane network element 6 shown in FIG. 6 the control plane network element 7 shown in FIG. 7, where the computer software instruction includes a program designed for performing the foregoing method embodiment. The stored program is executed, so that user plane resources can be effectively managed.

An embodiment of the present disclosure further provides another computer storage medium, configured to store a computer software instruction used by the user plane network element 9 shown in FIG. 9 the control plane network element 8 shown in FIG. 8, where the computer software instruction includes a program designed for performing the foregoing method embodiment. The stored program is executed, so that user plane resources can be effectively managed.

It should be noted that, for a brief description, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in this specification are example embodiments, and the related actions and modules are not necessarily mandatory to the present disclosure.

In the foregoing embodiments, the descriptions of the embodiments have respective focuses. For a part that is not described in detail in an embodiment, refer to related descriptions in other embodiments.

Steps in the method in the embodiments of the present disclosure may be adjusted, combined, or deleted based on an actual requirement.

Units in the apparatus in the embodiments of the present disclosure may be adjusted, combined, or deleted based on an actual requirement. A person skilled in the art may integrate or combine different embodiments and characteristics of different embodiments described in this specification.

With descriptions of the foregoing embodiments, a person skilled in the art may clearly understand that the present disclosure may be implemented by using hardware, firmware or a combination thereof. When the present disclosure is implemented by using software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example instead of a limitation: The computer readable medium may include a random access memory (RAM), a read-only memory (ROM), an electrically erasable programmable read-only memory (EEPROM), a compact disc read-only memory (CD-ROM) or other optical disc storage, a magnetic disk storage medium or another magnetic storage device, or any other medium that can be used to carry or store expected program code in a command or data structure form and that can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio, and microwave, the coaxial cable, optical fiber/cable, twisted pair, DSL or wireless technologies such as infrared ray, radio, and microwave are included in fixation of a medium to which they belong. For example, a disk and disc used in the present disclosure includes a compact disc (CD), a laser disc, an optical disc, a digital versatile disc, a floppy disk, and a Blu-ray disc, where the disk generally copies data magnetically, and the disc copies data optically by using a laser. The foregoing combination should also be included in the protection scope of the computer-readable medium.

In conclusion, the foregoing description shows merely example embodiments of the technical solutions of the present disclosure, but is not intended to limit the protection scope of the present disclosure. Any modification, equivalent replacement, or improvement made without departing from the principle of the present disclosure shall fall within the protection scope of the present disclosure.

What is claimed is:

1. A user plane resource management method, comprising:
   receiving, by a user plane network element, a data transmission channel establishment request message sent by a control plane network element, wherein the data transmission channel establishment request message is used to instruct the user plane network element to establish a data transmission channel, wherein before the receiving, by the user plane network element, the data transmission channel establishment request message, sending, by the user plane network element, a capability indication to the control plane network element for indicating that the user plane network element supports a channel management capability, wherein the channel management capability comprises a plurality of the following: a channel identifier assignment capability, channel detection, and channel status reporting;
   establishing, by the user plane network element, the data transmission channel based on current user plane resource status information, the user plane resource status information comprises resource status information of at least one internal resource block of the user plane network element, the internal resource block is represented by using an internal resource block identifier, and assigning a channel identifier marking the data transmission channel; and
   sending, by the user plane network element, the channel identifier to the control plane network element.

2. The method according to claim 1, wherein the internal resource block is a hardware resource block or a virtual resource block.

3. The method according to claim 1, wherein the user plane resource status information further comprises at least one assignable channel identifier that is used to mark a data transmission channel and that corresponds to the internal resource block.

4. The method according to claim 1, wherein the user plane resource status information further comprises at least one assignable channel identifier that is used to mark a data transmission channel and that is of the user plane network element.

5. A user plane network element, comprising:
   a communications interface; and
   a processor configured to:
     receive, through the communications interface, a data transmission channel establishment request message sent by a control plane network element, wherein the data transmission channel establishment request message is used to instruct the user plane network element to establish a data transmission channel, wherein before the receiving, by the user plane network element, the data transmission channel establishment request message, sending, by the user plane network element through the communications interface, a capability indication to the control plane network element for indicating that the user plane network element supports a channel management capability, wherein the channel management capability comprises a plurality of the following: a channel identifier assignment capability, channel detection, and channel status reporting,
     establish the data transmission channel based on current user plane resource status information, the user plane resource status information comprises resource status information of at least one internal resource block of the user plane network element, the internal resource block is represented by using an internal resource block identifier, and assign a channel identifier marking the data transmission channel, and
     send, through the communications interface, the channel identifier to the control plane network element.

6. The user plane network element according to claim 5, wherein the internal resource block is a hardware resource block or a virtual resource block.

7. The user plane network element according to claim 5, wherein the user plane resource status information further comprises at least one assignable channel identifier that is used to mark a data transmission channel and that corresponds to the internal resource block.

8. The user plane network element according to claim 5, wherein the user plane resource status information further comprises at least one assignable channel identifier that is used to mark a data transmission channel and that is of the user plane network element.

9. A control plane network element, comprising:
   a communications interface; and
   a processor configured to:
     receive, through the communications interface, a capability indication of a user plane network element, wherein the capability indication is used to indicate that the user plane network element supports a channel management capability, wherein the channel management capability comprises a plurality of the following: a channel identifier assignment capability, channel detection, and channel status reporting, and send, through the communications interface, a data transmission channel establishment request message to the user plane network element, wherein the data transmission channel establishment request message does not comprise a channel identifier, the data transmission channel establishment request message for instructing the user plane network element to establish a data transmission channel, and receive, through the communications interface, a channel identifier sent by the user plane network element.

\* \* \* \* \*